United States Patent
Jeon

(10) Patent No.: US 8,015,959 B2
(45) Date of Patent: Sep. 13, 2011

(54) VALVE SHAFT SUPPORT STRUCTURE FOR VARIABLE INTAKE MANIFOLD

(75) Inventor: Yong Joo Jeon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 532 days.

(21) Appl. No.: 12/259,853

(22) Filed: Oct. 28, 2008

(65) Prior Publication Data

US 2010/0006051 A1    Jan. 14, 2010

(30) Foreign Application Priority Data

Jul. 14, 2008    (KR) .................. 10-2008-0068200

(51) Int. Cl.
*F02M 35/10* (2006.01)
(52) U.S. Cl. .................. 123/184.56; 123/336
(58) Field of Classification Search ............ 123/184.53, 123/184.56, 306, 336, 337
See application file for complete search history.

(56) References Cited

U.S. PATENT DOCUMENTS 6,895,926 B1    5/2005   Moreau et al.

FOREIGN PATENT DOCUMENTS

| JP | 6-10715 A | 1/1994 |
|---|---|---|
| KR | 10-2005-0025418 A | 3/2005 |

*Primary Examiner* — Noah Kamen
(74) *Attorney, Agent, or Firm* — Morgan, Lewis & Bockius LLP

(57) ABSTRACT

A valve shaft support structure is closed to improve its durability, lower its manufacturing cost and improve its quality, in which a valve shaft interposed between runners is formed as an eccentric shaft integrally formed with a valve. A valve and a valve shaft are formed in a body to support the valve. An eccentric circular protrusion is formed in a center portion of the valve shaft, and divided manifold bodies support the eccentric circular protrusion. The valve shaft and the manifold bodies are repeatedly in contact or non-contact with each other when the valve is opened or closed.

14 Claims, 10 Drawing Sheets

$R_1 < R_2$

VALVE SHAFT SUPPORT STRUCTURE FOR VARIABLE INTAKE MANIFOLD

CROSS-REFERENCES TO RELATED APPLICATIONS

The present application claims priority to Korean Patent Application No. 10-2008-0068200, filed on Jul. 14, 2008, the entire contents of which is incorporated herein for all purposes by this reference.

BACKGROUND OF THE INVENTION

The present invention relates to a valve shaft support structure, and more particularly, to a valve shaft support structure for a variable intake manifold, which can improve its durability, lower its manufacturing cost, and improve its quality, through forming of a valve shaft interposed between runners as a shaft integrally formed with a valve.

An intake manifold is a system of pipes which feeds air sucked through a throttle body into combustion chambers, and serves to uniformly distribute the air to the respective combustion chambers in a multi-cylinder internal combustion engine.

With the intake manifold, the engine efficiency is varied depending upon the length of a runner, through which the air passes. The length of the runner is preferably long if the engine is driven at a middle or low-speed range, while the length of the runner is preferably short if the engine is driven at a high-speed range.

As an alternative proposal, a variable induction system (VIS) which varies a length and a cross section of a runner in order to optimize a length and a cross section of an intake manifold depending upon an operation region of an engine has been developed and applied to the engine.

More specifically, a VIS variable intake manifold may improve the performance through the whole RPM range by opening or closing a valve of the intake manifold to effectively vary a length of the runner through various RPM ranges of an engine.

FIG. 1 is a view showing a flow of air produced when a valve of a conventional VIS intake manifold is opened or closed.

As shown in FIG. 1, when a valve 1 is opened, a flow of air is indicated by a line C1. While the valve 1 is closed, the flow of air is indicated by a line C2.

In the case where the valve 1 is opened, the flow path of air is short. By contrast, in the case where the valve 1 is closed, the flow path of air is long.

FIG. 2 is a view illustrating a conventional valve shaft support structure in the VIS intake manifold.

The valve shaft support structure 10 includes a shaft 11 and a bush 13 assembled to the shaft 11. The shaft 11 is interposed between runners is supported by the separate bush 13. Since there is no means for damping vibration generated when the engine is driven, the bush 13 supporting the valve shaft 11 and a valve screw (not shown) are released from a proper position. Also, undesired clearance or play may occur between the valve shaft 11 and the bush 13 due to wearing of the valve shaft and the bush, so that the valve shaft 11 becomes loose.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Accordingly, various aspects of the present invention have been developed to solve the above-mentioned problems occurring in the prior art while advantages achieved by the prior art are maintained intact.

One aspect of the present invention is to provide a valve shaft support structure for a variable intake manifold, which can improve its durability, lower its manufacturing cost, and improve its quality, through forming of a valve shaft interposed between runners as an eccentric shaft integrally formed with a valve so that the valve shaft comes in contact with a manifold body supporting the valve shaft at predetermined intervals when the valve is opened or closed.

In order to accomplish these aspects, a valve shaft support structure is provided for a variable intake manifold, which may include at least a valve; a valve shaft integrally formed with the valve to support the valve; a circular protrusion formed substantially in a center portion of the valve shaft; and divided manifold bodies rotatably supporting the circular protrusion therebetween, wherein a portion of the circular protrusion is repeatedly positioned in one of the divided manifold bodies when the valve shaft is rotated so that direct contact of the valve shaft with the divided manifold bodies is prevented.

Receiving spaces of different size may be formed at a joint portion of each divided intake manifold body and the circular protrusion is positioned in the receiving spaces.

The circular protrusion may comprise a concentric portion and a protruding portion extending from the concentric portion, the concentric portion being concentric with the valve shaft and the protruding portion formed in an eccentric shape. The protruding portion may be formed substantially along a half circumference of the valve shaft. An inner diameter of the concentric portion and the protruding portion is the same as the outer diameter of the valve shaft, and an outer diameter of the protruding portion is gradually increased in the eccentric shape fro m an outer diameter of the concentric portion.

The valve may be made of plastic.

The valve shaft may be made of stainless steel.

The circular protrusion may be formed by overmolding rubber on the valve shaft.

In another aspect, a valve shaft support structure for a variable intake manifold, may include at least a valve; a valve shaft integrally formed with the valve to support the valve; a circular protrusion formed substantially in a center portion of the valve shaft; and divided manifold bodies rotatably supporting the circular protrusion therebetween, wherein a portion of the circular protrusion is repeatedly positioned in one of the divided manifold bodies when the valve shaft is rotated so that direct contact of the valve shaft with the divided manifold bodies is prevented, wherein receiving spaces of different size are formed at a joint portion of each divided intake manifold body and the circular protrusion is positioned in the receiving spaces, and wherein the circular protrusion comprises a concentric portion and a protruding portion extending from the concentric portion, the concentric portion being concentric with the valve shaft in a predetermined distance from the valve shaft and the protruding portion formed in an eccentric shape by gradually increasing an outer diameter of the protruding portion.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A valve shaft support structure according to an exemplary embodiment of the present invention will now be described in detail with reference to FIGS. 3 to 4.

FIGS. 3A to 3F are views illustrating a valve shaft support structure according to an exemplary embodiment of the present invention.

Figure 1:
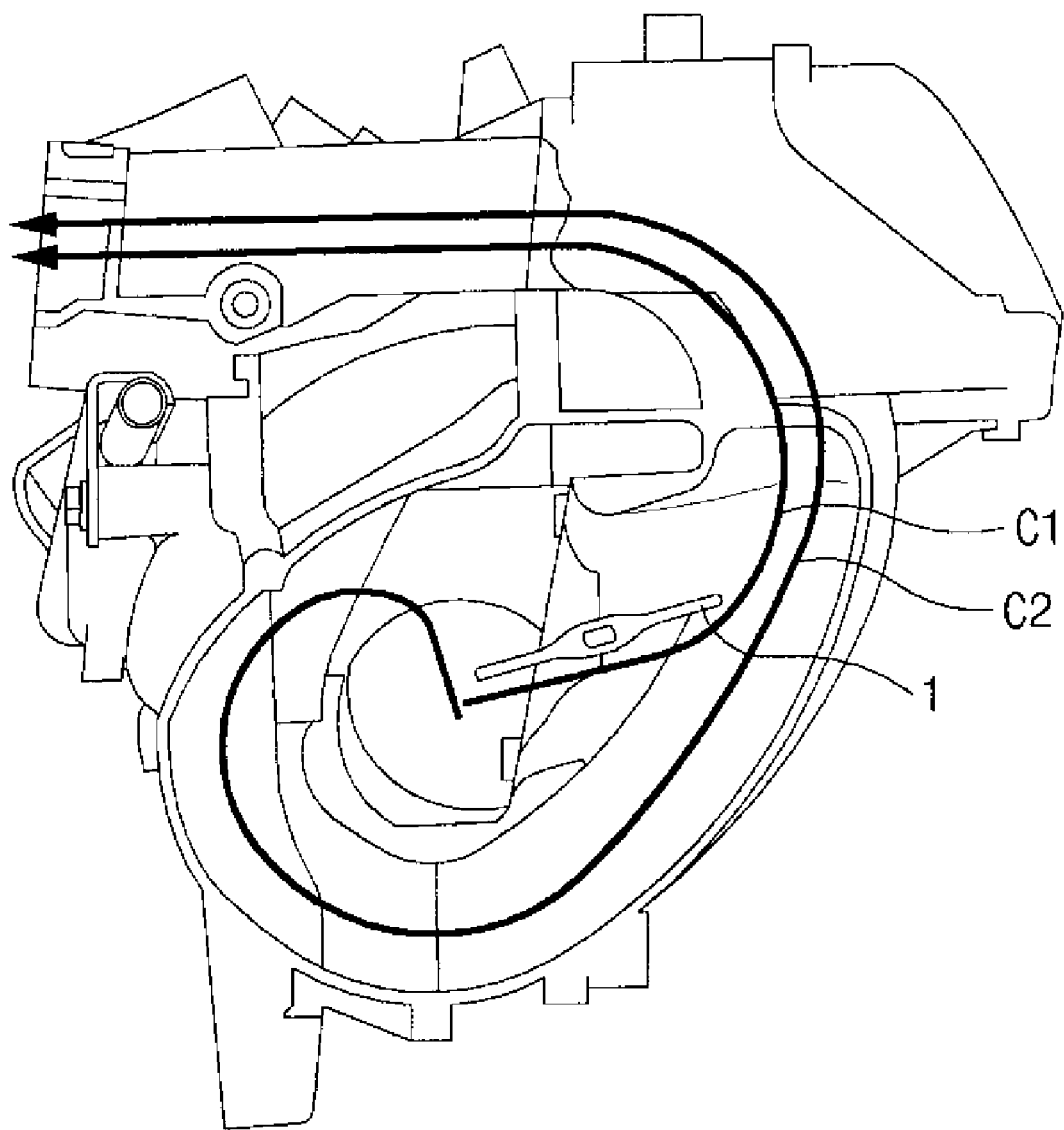
FIG. 1 is a view showing a flow of air produced when a valve of a conventional VIS intake manifold is opened or closed.
Figure 2:
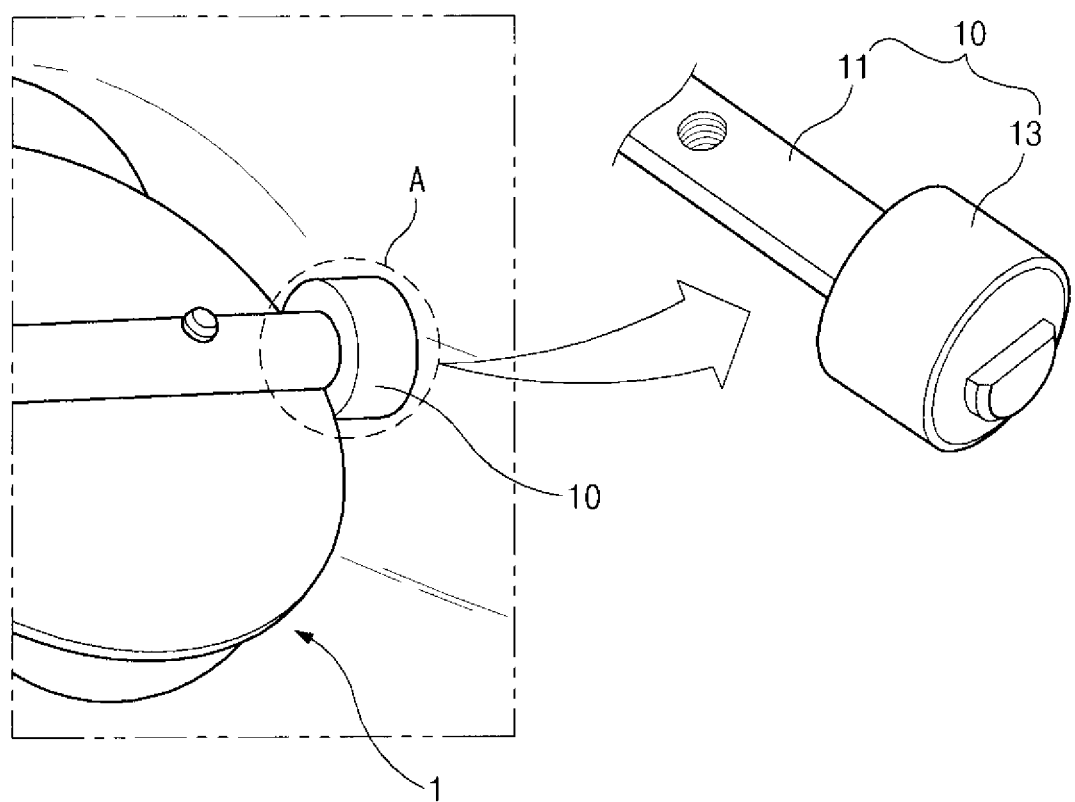
FIG. 2 is a view illustrating a conventional valve shaft support structure for a VIS intake manifold.
Figure 3A:
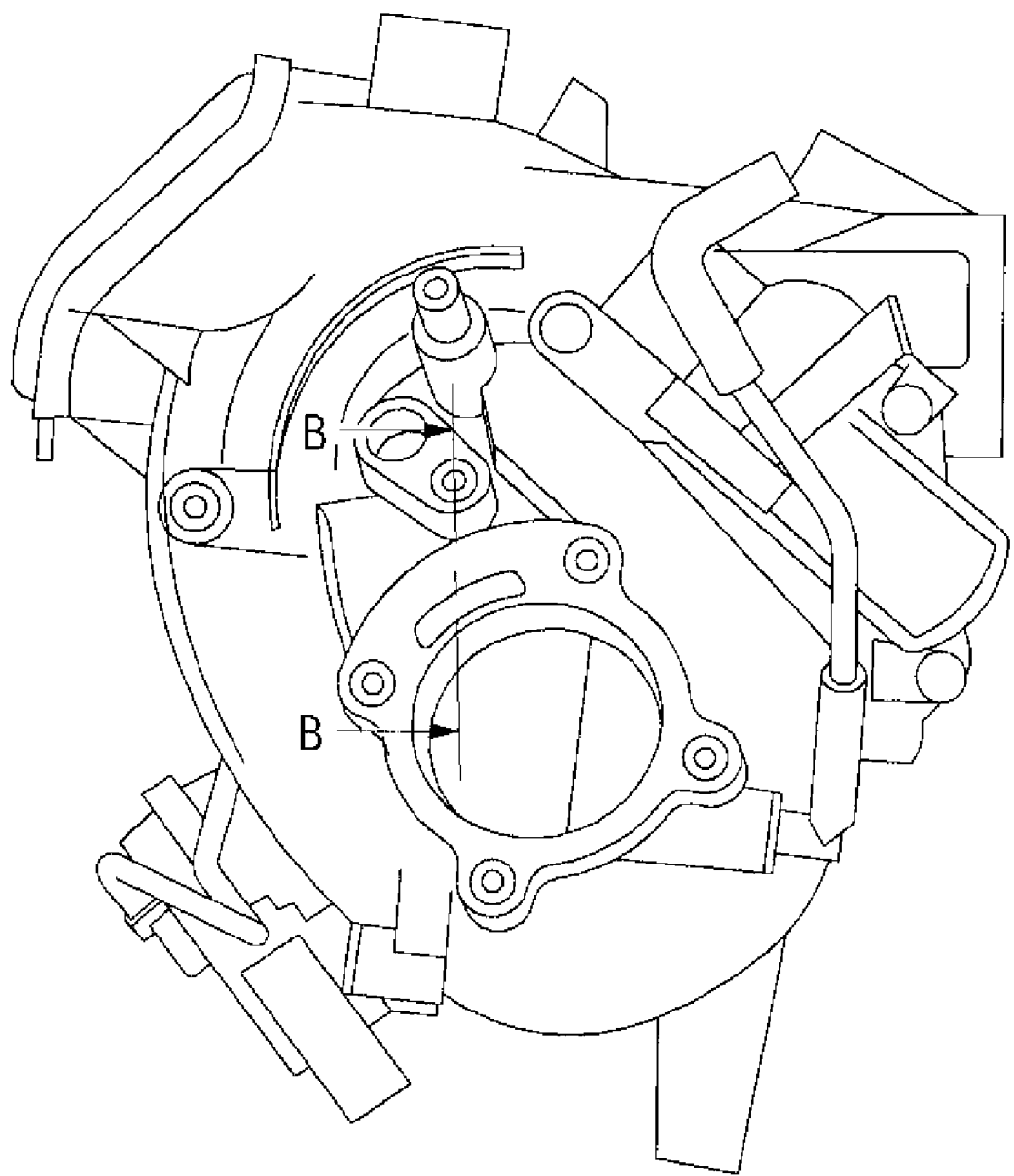
FIGS. 3A, 3B, 3C, 3D, 3E, AND 3F are views illustrating an exemplary valve shaft support structure according to various aspects of the present invention.
Figure 3B:
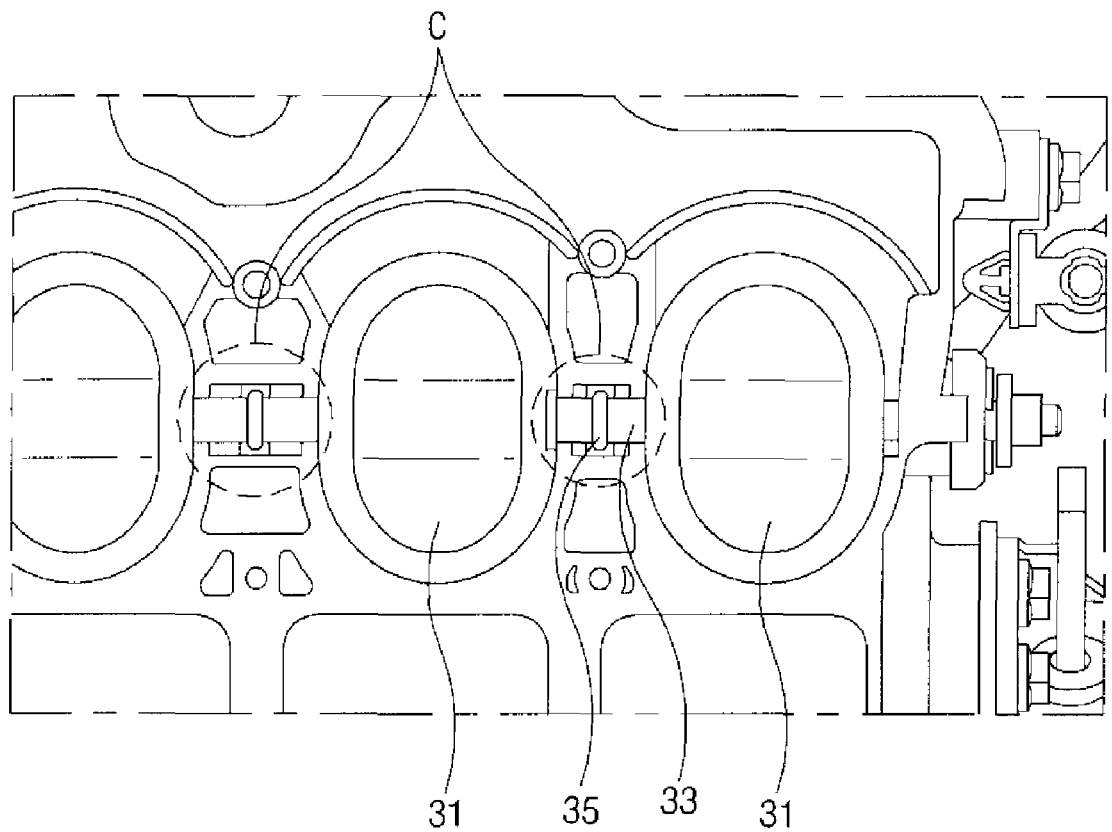
Figure 3C:
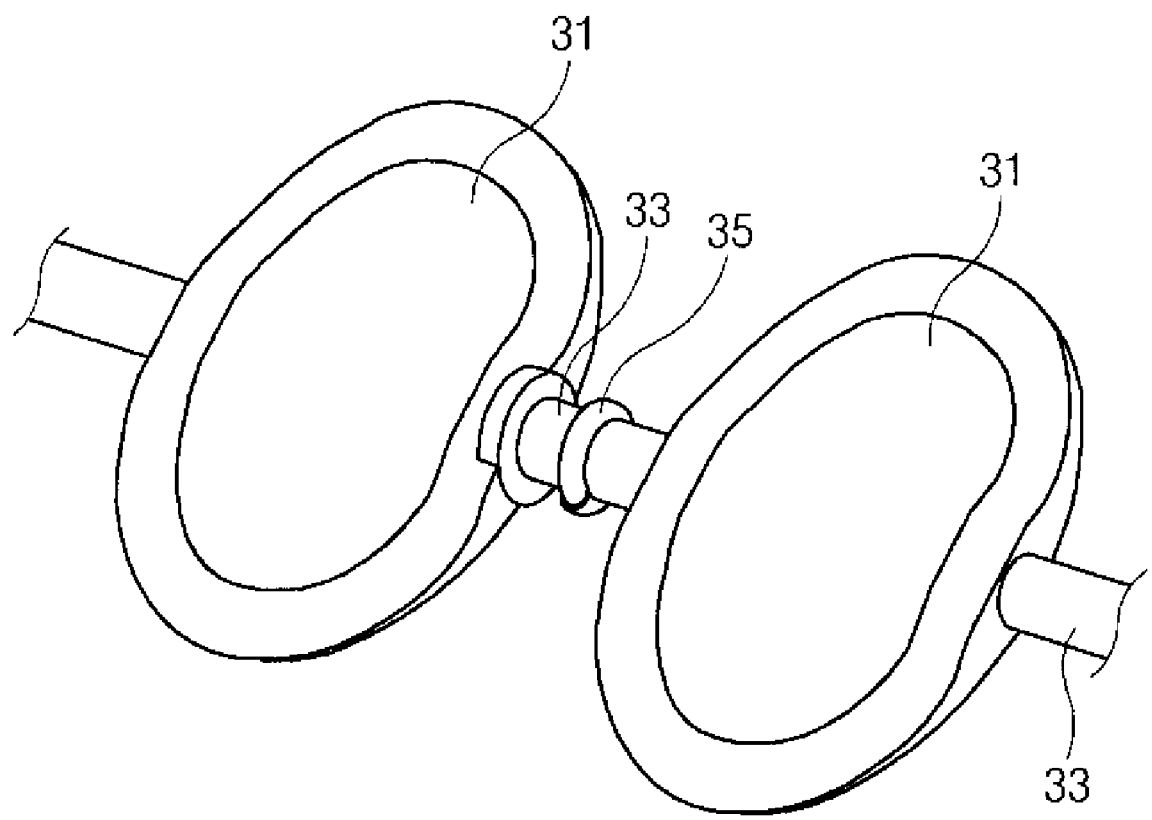
Figure 3D:
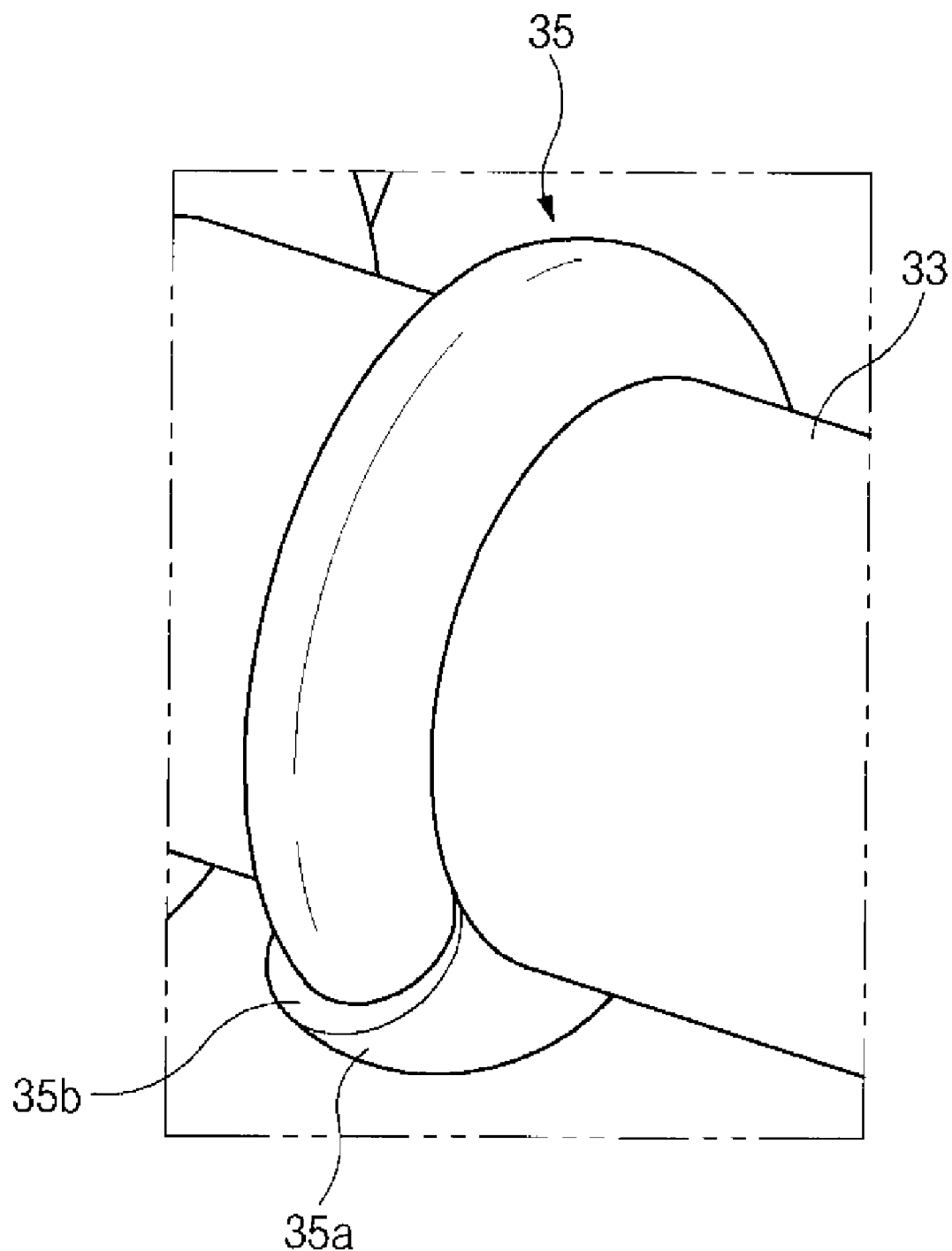
Figure 3E:
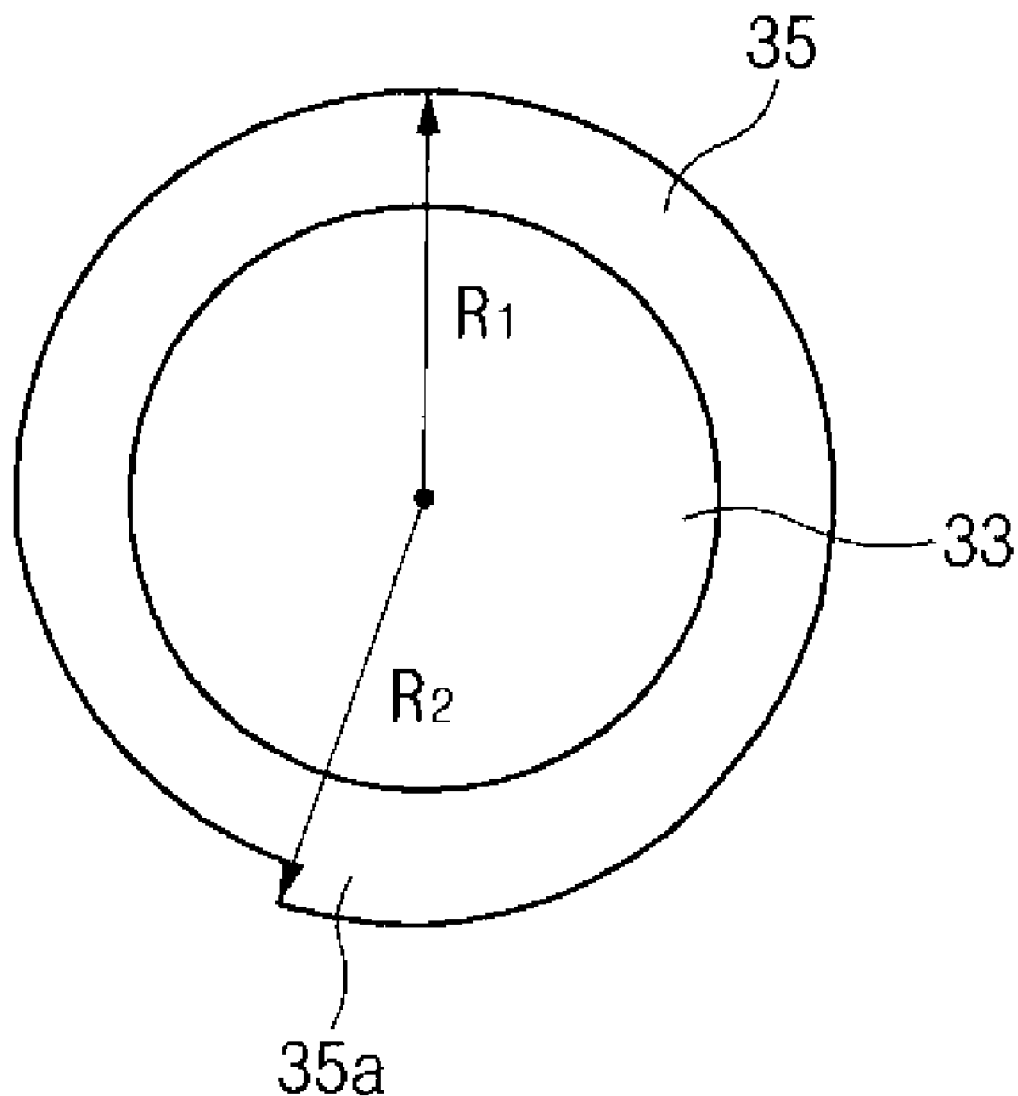
Figure 3F:
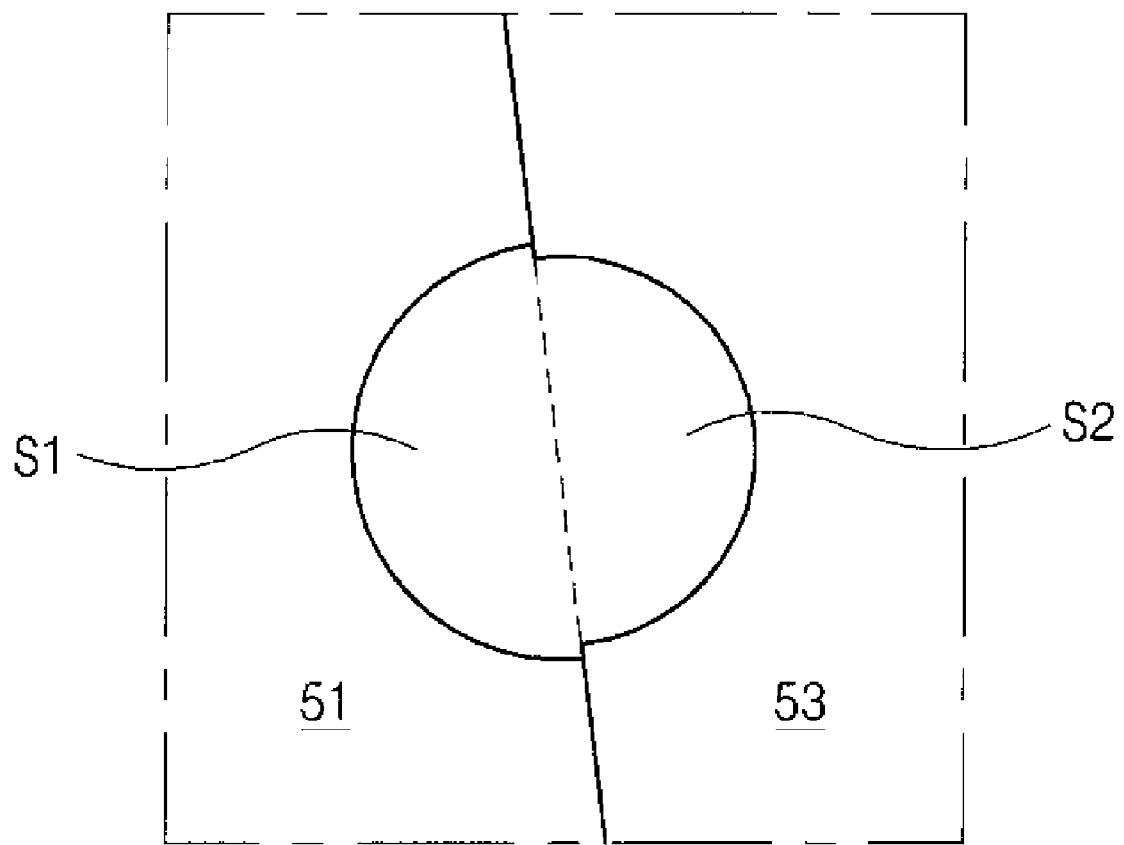

FIG. 3A is a perspective view illustrating an exemplary a housing that accommodates a plurality of intake manifolds therein. FIG. 3B is a cross-sectional view taken along line B-B in FIG. 3A. FIGS. 3C and 3D are detail views of the valve shaft in FIG. 3B. FIG. 3E is a cross-sectional view illustrating a circular protrusion formed on the valve shaft according to an exemplary embodiment of the present invention. FIG. 3F is a view illustrating the state in which two separate manifold bodies are joined to each other to form a receiving space of different size.

Referring to FIGS. 3A to 3F, the valve shaft support structure according to an exemplary embodiment of the present invention includes valves 31 and a valve shaft 33 which are formed integrally at the valves 31, and an O-shaped circular protrusion 35 formed in a center portion of the valve shaft 33 positioned between the valves 31. The circular protrusion 35 is supported by intake manifold bodies 51 and 53, and is rotated therein.

An intake manifold body supporting the circular protrusion 35 of the valve shaft 33 is divided into two bodies 51 and 53, as shown in FIG. 3F. Receiving spaces S1 and S2 formed by joining two manifold bodies 51 and 53 are formed in different sizes having different radii.

For example, a semicircular receiving space S1 formed by one manifold body 51 is larger than the semicircular receiving space 52 formed by the other manifold body 53 opposite to the receiving space S1.

The circular protrusion 35 is formed in an eccentric shape around the valve shaft 33, as shown in FIG. 3E. The circular protrusion 35 comprises a concentric portion 35c having an outer diameter of R1 and a protruding portion 35a having an outer diameter increasing from R1 to R2, wherein the protruding portion 35a extends from the concentric portion 35c. The radial distance of the protruding portion 35a is gradually increased along a half circumference of the valve shaft 33 in an exemplary embodiment. In this instance, when the circular protrusion 35 is formed, an outer diameter of the concentric portion 35c is R1 but an outer diameter of the protruding portion 35a is changed from R1 to R2.

A stepped portion 35b is formed between the protruding portion 35a of increased radius R2 along the outer circumference of the valve shaft 33 and the concentric portion 35c having an original radius R1. More specifically, when comparing a radius R1 of the concentric portion with a radius R2 of an eccentric portion in the circular protrusion 35, R1 is shorter than R2.

Figure 4A:
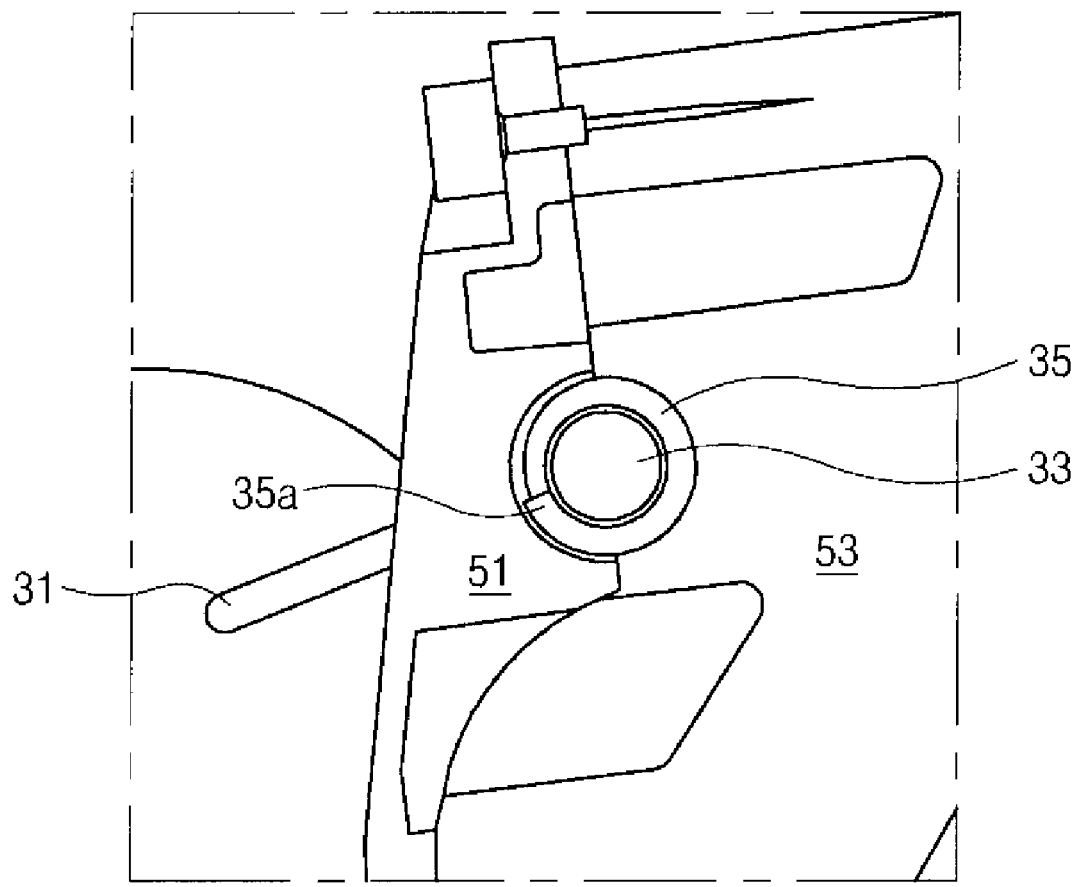
FIGS. 4A and 4B are views illustrating a cross-sectional state of the valve shaft support structure in FIG. 3B.
Figure 4B:
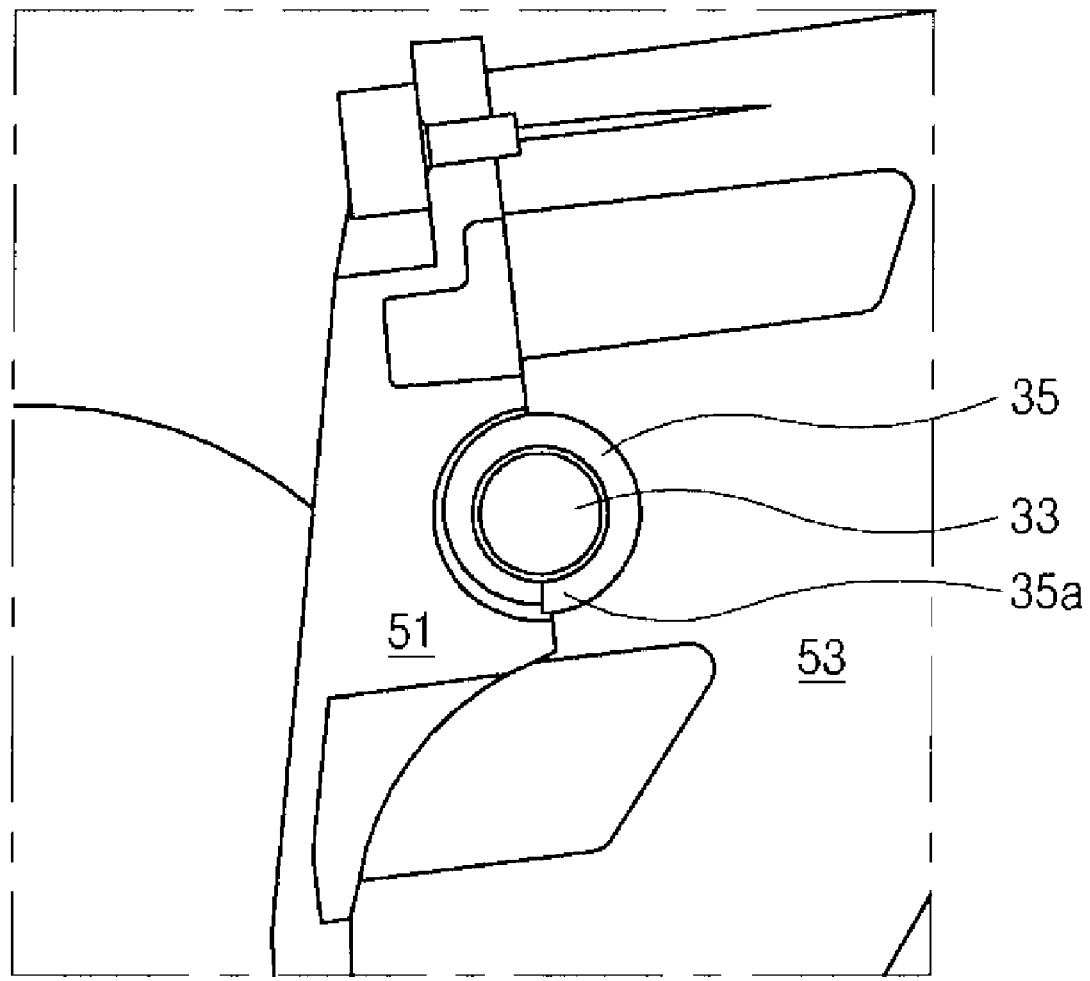

FIGS. 4A and 4B are views illustrating a cross-sectional state of the valve shaft support structure in FIG. 3B to show variations of a contact state between the valve shaft 33 and the manifold bodies 51 and 53 when the valve is opened or closed.

Referring to FIG. 4A showing the opened valve, the protruding portion 35a of the circular protrusion 35 formed at the valve shaft 33 is positioned in the relatively larger receiving space S1 among the receiving spaces 51 and S2 which are formed by joining two manifold bodies 51 and 53. Consequently, the valve shaft 33 does not fully contact with the manifold bodies 51 and 53, so that the valve shaft 33 is detached or substantially detached from the manifold bodies 51 and 53.

Referring to FIG. 4B showing the closed valve, the protruding portion 35a of the circular protrusion 35 formed at the valve shaft 33 is positioned in the relatively smaller receiving space S2 to maintain the contact state of the valve shaft 33 and the manifold bodies 51 and 53.

Therefore, the valve shaft 33 is formed integrally with the valve 31, and the circular protrusion 35 is formed substantially in the center portion of the valve shaft 33, in which the outer diameter R1 at the concentric portion 35c of the circular protrusion 35 is gradually increased to R2 to form the eccentricity at the protruding portion 35a. The eccentricity may be formed along a half circumference of the valve shaft 33.

The manifold body contacting the circular protrusion 35 and supporting the valve shaft 33 may be divided into two parts 51 and 53, and the receiving spaces S1 and S2 of different sizes are respectively formed in the manifold bodies 51 and 53 when the manifold bodies are joined to each other. Consequently, the protruding portion 35a of the circular protrusion 35 is moved in or out from the receiving spaces S1 and S2 in accordance with the rotation of the valve 31. When the valve shaft 33 is repeatedly rotated, the manifold bodies 51 and 53 are rotated at predetermined intervals, thereby improving the durability at the joint portion.

Also, there is an advantage in that deterioration of the durability is prevented due to the release of a bush mounted on the valve shaft or the loose-fit of a contact portion between the bush and the valve shaft or a separate member and the valve shaft.

The valve 31 may be made of plastic, and the valve shaft 33 may be made of stainless steel. Preferably, the circular protrusion 35 is formed by overmolding rubber on the valve shaft 33 made of stainless steel. One will appreciate that other suitable materials may be used.

For convenience in explanation and accurate definition in the appended claims, the terms "up" or "upper", "down" or "lower", "front" or "rear", "inside", and etc. may be used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A valve shaft support structure for a variable intake manifold, comprising:
   a valve;
   a valve shaft integrally formed with the valve to support the valve;
   an eccentric circular protrusion formed in a central portion of the valve shaft; and
   divided manifold bodies supporting the valve shaft, each manifold body having a receiving space receiving the eccentric circular protrusion therebetween,
   wherein the eccentric circular protrusion rotatingly reciprocates within the receiving spaces as the valve opens and closes.

2. The valve shaft support structure as claimed in claim 1, wherein the valve shaft and manifold bodies are reciprocally in contact or non-contact with each other as the valve reciprocates open and closed.

3. The valve shaft support structure as claimed in claim 1, wherein the receiving spaces of the divided manifold bodies are of different sizes are formed at a joint surface of the divided intake manifold bodies.

4. The valve shaft support structure as claimed in claim 1, wherein the eccentric circular protrusion comprises a concentric portion and a protruding portion extending from the concentric portion, the concentric portion being concentric with the valve shaft and the protruding portion formed in an eccentric shape.

5. The valve shaft support structure as claimed in claim 4, wherein the protruding portion is formed substantially along a half circumference of the valve shaft.

6. The valve shaft support structure as claimed in claim 4, wherein the diameter of the concentric portion and a minimum diameter of the protruding portion are the same as the outer diameter of the valve shaft, and an increasing diameter of the protruding portion is gradually increased in an eccentric shape from the diameter of the concentric portion.

7. The valve shaft support structure as claimed in claim 1, wherein the valve is made of plastic.

8. The valve shaft support structure as claimed in claim 1, wherein the valve shaft is made of stainless steel.

9. The valve shaft support structure as claimed in claim 1, wherein the eccentric circular protrusion is formed by overmolding rubber on the valve shaft.

10. An engine comprising the valve shaft support structure of claim 1.

11. A passenger vehicle comprising the valve shaft support structure of claim 1.

12. A valve shaft support structure for a variable intake manifold, comprising:
    a valve;
    a valve shaft integrally formed with the valve to support the valve;
    a circular protrusion formed in a central portion of the valve shaft; and
    divided manifold bodies rotatably supporting the circular protrusion therebetween,
    wherein a portion of the circular protrusion is repeatedly positioned in one of the divided manifold bodies when the valve shaft is rotated so that full contact of the valve shaft with the divided manifold bodies is prevented,
    wherein receiving spaces of different size are formed at a joint surface of each divided intake manifold body and the circular protrusion is positioned in the receiving spaces, and
    wherein the circular protrusion comprises a concentric portion and a protruding portion extending from the concentric portion, the concentric portion being concentric with the valve shaft and having a diameter, and the protruding portion formed in an eccentric shape with a gradually increasing diameter extending from the diameter of the concentric portion.

13. An engine comprising the valve shaft support structure of claim 12.

14. A passenger vehicle comprising the valve shaft support structure of claim 12.

* * * * *